United States Patent
Le Digabel et al.

(10) Patent No.: US 11,139,119 B2
(45) Date of Patent: Oct. 5, 2021

(54) SUPERCAPACITOR COMPRISING AN ELECTROLYTE COMPOSITION COMPRISING AN ADDITIVE FROM THE FAMILY OF FLUORINATED PHOSPHAZENES

(71) Applicant: COMMISSARIAT À L'ÉNERGIE ATOMIQUE ET AUX ÉNERGIES ALTERNATIVES, Paris (FR)

(72) Inventors: Matthieu Le Digabel, Monts (FR); Agnés Biller, Saint Avertin (FR); Nelly Penot, Monts (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/640,249

(22) PCT Filed: Aug. 20, 2018

(86) PCT No.: PCT/FR2018/052077
§ 371 (c)(1),
(2) Date: Feb. 19, 2020

(87) PCT Pub. No.: WO2019/038499
PCT Pub. Date: Feb. 28, 2019

(65) Prior Publication Data
US 2020/0365337 A1  Nov. 19, 2020

(30) Foreign Application Priority Data
Aug. 22, 2017 (FR) ...................... 1757786

(51) Int. Cl.
*H01G 11/64* (2013.01)
*H01G 11/60* (2013.01)
*H01G 11/34* (2013.01)
*H01G 11/62* (2013.01)

(52) U.S. Cl.
CPC ............. *H01G 11/60* (2013.01); *H01G 11/34* (2013.01); *H01G 11/62* (2013.01); *H01G 11/64* (2013.01)

(58) Field of Classification Search
None
See application file for complete search history.

(56) References Cited

U.S. PATENT DOCUMENTS

| 2005/0164093 A1* | 7/2005 | Otsuki ............. H01M 10/0568 429/324 |
| 2006/0092596 A1* | 5/2006 | Otsuki ................... H01G 11/64 361/502 |
| 2012/0189920 A1* | 7/2012 | Li ....................... H01M 10/052 429/331 |
| 2013/0302702 A1* | 11/2013 | Matsumoto ......... H01M 2/1626 429/336 |
| 2017/0288269 A1* | 10/2017 | Moganty ................ H01G 11/64 |
| 2020/0079733 A1* | 3/2020 | Cadra ....................... C07F 7/10 |

FOREIGN PATENT DOCUMENTS

| EP | 1577913 A1 | 9/2005 |
| EP | 2660920 A2 | 11/2013 |
| EP | 3076471 A1 | 10/2016 |
| JP | 2007311553 A | 11/2007 |
| JP | 2009054884 A | 3/2009 |
| JP | 2011165553 A | 8/2011 |
| WO | 2017069058 A1 | 4/2017 |

OTHER PUBLICATIONS

International Search Report for PCT/FR2018/052077 dated Nov. 11, 2018 and translation thereof.
Written Opinion for PCT/FR2018/052077 dated Nov. 11, 2018.
Search Report for French Application No. 1757786 dated Apr. 13, 2018.

* cited by examiner

*Primary Examiner* — Dion Ferguson
(74) *Attorney, Agent, or Firm* — Pearne & Gordon LLP

(57) ABSTRACT

A supercapacitor comprising at least one cell formed of two electrodes of opposite polarity. The cell is formed from a positive electrode and a negative electrode made of activated carbon, between which an electrolyte composition is arranged comprising at least one nitrile solvent, at least one salt and also comprising at least one additive from the family of phosphazenes having at least one fluorine atom. One of the compositions comprises acetonitrile, a tetramethylammonium tetrafluoroborate salt and an additive, hexafluorocyclotriphosphazene at a concentration of 1 to 10%.

16 Claims, No Drawings

SUPERCAPACITOR COMPRISING AN ELECTROLYTE COMPOSITION COMPRISING AN ADDITIVE FROM THE FAMILY OF FLUORINATED PHOSPHAZENES

CROSS-REFERENCE TO RELATED APPLICATIONS

This is a National Stage application of PCT international application PCT/FR2018/052077, filed on Aug. 20, 2018, which claims the priority of French Patent Application No. 17 57786, filed Aug. 22, 2017, both of which are incorporated herein by reference in their entirety.

TECHNICAL FIELD

The present invention relates to supercapacitors comprising electrolyte compositions resulting from the original association between an additive from the family of phosphazenes and a type of specific organic solvent that are usable, these compositions allowing improvement in the capacity of such devices even after a very large number of charge-discharge cycles.

The present invention also relates to new electrolyte compositions that can be used in constituting these electrolytes.

STATE OF PRIOR ART

There are three main types of energy storage devices enabling electric energy to be reversibly stored: conventional dielectric capacitors, storage cells or secondary electrochemical generators and supercapacitors.

From the operation point of view, supercapacitors operate on the principle of an Electrochemical Double Layer Capacitor (EDLC), that is in other words on the principle of energy storage by distributing ions from an electrolyte in the vicinity of the surface of two electrolyte-impregnated porous electrodes, separated by an insulating porous membrane ensuring ionic conduction.

Thus, a basic cell of a supercapacitor can essentially consist of the following elements:
- a positive electrode;
- a positive electrode/electrolyte interface forming a double electric layer;
- an insulating porous membrane impregnated with said electrolyte;
- a negative electrode; and
- a negative electrode/electrolyte interface forming a double electric layer.

Because of the existence of these two interfaces each forming a double electrochemical layer, a supercapacitor can be schematically considered as the association of two capacitors in series, one at the positive electrode and the other at the negative electrode, these two capacitors being created by applying a current across the supercapacitor, which creates a charge zone at both electrode-electrolyte interfaces, the energy being thus stored electrostatically and not electrochemically.

Given that the energy stored and the power delivered by a supercapacitor are a function of the square of the applicable nominal voltage, it is thus understood that the performances of a supercapacitor can be greatly improved by varying the increase in the applicable nominal voltage across the supercapacitor with the requirement to find an electrolyte adapted to the maximum potential difference existing across the supercapacitor (in other words, the electrolyte has to remain stable in the electrochemical window given by the supercapacitor) while having the expected characteristics for an electrolyte, namely:
- a proper ionic conductivity;
- a high temperature range; and
- a relatively low viscosity so as to allow a proper ion mobility.

Currently, two types of electrolytes are mostly used in supercapacitors:
- aqueous electrolytes, consisting of one or more salts dissolved in water; and
- organic electrolytes, consisting of one or more salts dissolved in an organic solvent.

As regards aqueous electrolytes, whether they are acid (for example, a sulphuric acid solution) or basic (for example, a potash solution), the applicable nominal voltage range, for water decomposition reasons, is limited to about 1V, which necessitates, to reach classic voltages (for example, 12V), performing complex arrangements of several supercapacitor units. Moreover, the accessible temperature range is limited because of the low solubility of some salts in an aqueous medium, which does not enable these electrolytes to be used at temperatures lower than −20° C.

As regards organic electrolytes, they have a larger electrochemical stability window than aqueous electrolytes and thus immediately turn out more interesting for a use in supercapacitors.

Thus, based on this observation, the inventors set themselves the objective of providing compositions, preferably, non aqueous compositions usable as electrolytes for supercapacitors and which enable energy storage properties and, more particularly, the capacity to be improved even after a large number of charge and discharge cycles.

DISCLOSURE OF THE INVENTION

The inventors were able to achieve the abovementioned objective by developing a composition comprising the association of a specific organic solvent and a specific organic additive.

Thus, the invention relates to a supercapacitor comprising at least one cell comprising two electrodes of opposite polarity (respectively a positive electrode and a negative electrode), advantageously, based on activated carbon between which an electrolyte composition, preferably a non-aqueous composition, comprising at least one nitrile solvent, at least one salt and further comprising at least one additive from the family of phosphazenes comprising at least one fluorine atom, is disposed.

The nitrile solvent(s) is (are) solvents comprising at least one nitrile function —CN and more specifically can be:
- a dinitrile solvent (that is comprising two nitrile functions —CN), such as adiponitrile or glutaronitrile;
- a mononitrile solvent (that is, comprising a single nitrile function —CN), such as a solvent having the following formula (I):

in which $R^1$ represents an alkyl group comprising from 1 to 5 carbon atoms (which covers linear or branched alkyl groups) and one or more hydrogen atoms of which can be substituted with fluorine (in which case the alkyl groups concerned could be referred to as fluoroalkyl groups).

A particularly suitable nitrile solvent within the scope of the invention is acetonitrile of the formula $CH_3$—CN (also known by the abbreviation ACN), this solvent being particularly advantageous because it has a low viscosity, dissolves salts very efficiently and is highly dissociative.

Moreover:
it is very stable, both under oxidising and reducing conditions;
it has a dipole moment, which allows ion solvation; and
it has both a high donor number and a high acceptor number, therefore it can behave both as a Lewis acid and a Lewis base.

Regarding the salt, it can be a lithium salt, a sodium salt, a potassium salt or even a salt comprising a cation including at least one nitrogen atom, the positive charge of which is carried by said nitrogen atom (this cation can be referred to as an ammonium cation).

As regards lithium salts, $LiClO_4$, $LiBF_4$, $LiPF_6$, lithium bis(trifluoromethanesulfonyl)imide (known by the abbreviation LiTFSI), lithium bis(fluorosulfonyl)imide (known by the abbreviation LiFSI), lithium bis(oxalato)borate (known by the abbreviation LiBOB), $LiAlCl_4$, $LiSO_3CF_3$ and mixtures thereof can be mentioned, without being limited thereto.

As regards sodium salts, $NaClO_4$, $NaBF_4$, $NaPF_6$, sodium bis(trifluoromethanesulfonyl)imide, sodium bis(fluorosulfonyl)imide, sodium bis(oxalato)borate, $NaAlCl_4$, $NaSO_3CF_3$, NaSCN and mixtures thereof can be mentioned, without being limited thereto.

As regards potassium salts, $KClO_4$, $KBF_4$, $KPF_6$, potassium bis(trifluoromethanesulfonyl)imide, potassium bis(fluorosulfonyl)imide, potassium bis(oxalato)borate, $KAlCl_4$, $KSO_3CF_3$, KSCN and mixtures thereof can be mentioned, without being limited thereto.

Finally, as regards salts comprising a cation including at least one nitrogen atom, it can have the following general formula (II):

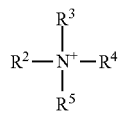

(II)

in which $R^2$, $R^3$, $R^4$ and $R^5$, identical or different from each other, represent an alkyl group comprising from 1 to 12 carbon atoms.

By way of example of ammonium cations, the tetraethylammonium cation (that is, a cation of the abovementioned formula (II) with $R^2$ to $R^5$ representing an ethyl group) can be mentioned.

The salt comprising the abovementioned cation type further comprises an anion so as to neutralise the cation, this anion can be a compound comprising a heteroatom carrying a negative charge, for example, chosen from a nitrogen atom or a boron atom.

By way of example, it can be a perfluorinated borate compound, such as a tetrafluoroborate compound of the following formula (III):

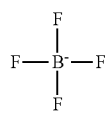

(III)

A particularly advantageous salt is a salt resulting from the association of a cation of the abovementioned formula (II) and a perfluorinated borate anion, such as, for example, tetraethylammonium tetrafluoroborate (also known by the abbreviation TEABF4).

The salt(s) included in the compositions of the invention can be present in a concentration ranging from 0.1 mol/L to 2 mol/L.

Further, the compositions of the invention comprise at least one additive from the family of phosphazenes comprising at least one fluorine atom.

It is specified that, by phosphazenes, it is meant compounds comprising at least one group comprising a pentavalent phosphorous atom and a nitrogen atom which are directly bonded through a double bond (that is, in other words a group —P=N—), these compounds can also be referred to as iminophosphorane compounds or phosphine imide compounds.

More specifically, the additive can be a phosphazene compound comprising a ring incorporating at least one group comprising a pentavalent phosphorous atom and a nitrogen atom directly bonded through a double bond and, more particularly incorporating three of these groups, such a compound can have the following formula (IV):

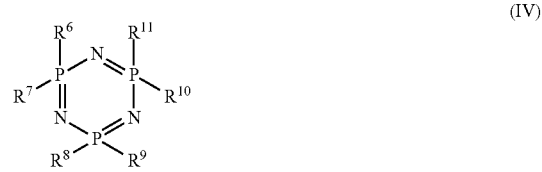

(IV)

in which $R^6$ to $R^{11}$ represent, independently of each other, a halogen atom (preferably, a fluorine atom), a hydrogen atom, an alkyl group comprising from 1 to 12 carbon atoms or an isocyanate group —NCO.

A particularly advantageous additive within the scope of this invention is a compound of the formula (IV), in which $R^6$ to $R^{11}$ represent a fluorine atom, this compound thus having the following specific formula (V):

(V)

this compound being also called hexafluorocyclotriphosphazene.

Said additive(s) can be present in the composition in an amount of 0.01 to 10%, preferably, 0.1% to 5 mass % relative to the total mass of the composition.

According to a particular embodiment of the invention, the electrolyte compositions can exclusively consist of at least one nitrile solvent, at least one salt and at least one additive from the family of phosphazenes comprising at least one fluorine atom.

Even more specific compositions in accordance with the invention are the following compositions:

a composition comprising acetonitrile, a tetraethylammonium tetrafluoroborate salt (for example, 1 mol/L) and a hexafluorocyclotriphosphazene additive with a content of 1 mass % relative to the total mass of the composition;

a composition comprising acetonitrile, a tetraethylammonium tetrafluoroborate salt (for example, 1 mol/L) and a hexafluorocyclotriphosphazene additive with a content of 2 mass % relative to the total mass of the composition;

a composition comprising acetonitrile, a tetraethylammonium tetrafluoroborate salt (for example, 1 mol/L) and a hexafluorocyclotriphosphazene additive with a content of 5 mass % relative to the total mass of the composition; or a composition comprising acetonitrile, a tetraethylammonium tetrafluoroborate salt (for example, 1 mol/L) and a hexafluorocyclotriphosphazene additive with a content of 10 mass % relative to the total mass of the composition.

These specific compositions advantageously exclusively consist of the abovementioned ingredients.

By means of the combination of ingredients constituting the compositions of the invention, the inventors were able to demonstrate a significant improvement in the performances of supercapacitor-type energy storage devices into which the compositions of the invention are introduced as electrolytes. More specifically, when the compositions are introduced as electrolytes in a supercapacitor-type device, it is possible to achieve an improvement in the discharge capacities of the supercapacitor in particular after 10 000 galvanostatic cycling test cycles and an improvement in the capacities in particular over 30 cyclic voltamperometry testing cycles while improving the device security, in particular the non-flammable character in contact with a flame. Thus, the compositions of the invention are, advantageously, electrolyte compositions.

Both polarity electrodes are, advantageously, based on activated carbon and can be of an identical composition.

Besides the presence of activated carbon, the electrodes can comprise one or more organic binders, which will contribute to ensure mechanical cohesion of said electrode.

These organic binders can in particular be polymeric binders comprising one or more polymers chosen from:

fluorinated polymers, such as polytetrafluoroethylene (known by the abbreviation PTFE), a polyvinylidene fluoride (known by the abbreviation PVDF), a poly(vinylidene fluoride-co-hexafluoropropene) copolymer (known by the abbreviation PVDF-HFP), a fluorinated ethylene-propylene copolymer (known by the abbreviation FEP), a copolymer from the copolymerisation of tetrafluoroethylene and perfluoroalkoxyvinylether (known by the abbreviation PFA);

polyimides;

polyacrylonitriles;

cellulosic polymers, such as a carboxymethylcellulose; and mixtures thereof.

The electrodes can also comprise an electrically conducting carbon additive other than activated carbon, chosen from carbon blacks, acetylene blacks, graphite, carbon nanotubes, carbon fibres and mixtures thereof, for example, the vapour grown carbon fibres (known by the abbreviation VGCF).

The electrodes can each be associated with an electrically conducting current collector, this current collector can be in the form of a metal foil affixed to one of the faces of said electrodes, wherein this metal foil can be an aluminium foil.

Finally, the electrolyte composition disposed between both electrodes advantageously impregnates a separator, which acts as a matrix for impregnating the composition and enables it to be held between both electrodes. This separator can be in the form of a single layer or multilayer porous polymeric film being coated or not with a compound able to improve electrolyte wettability or can be in the form of a porous film, for example, consisting of interleaved polyolefin fibres (for example, polyethylene fibres) or interleaved glass fibres.

Finally, among electrolyte compositions likely to be used in constituting the supercapacitors of the invention, some are novel and consist of electrolyte compositions comprising at least one nitrile solvent, at least one salt and further comprising at least one additive from the family of phosphazenes comprising at least one fluorine atom, characterised in that the salt is a salt comprising a cation including at least one nitrogen atom, the positive charge of which is carried by said nitrogen atom.

The specificities as regards the nitrile solvent(s), the additive(s) from the family of phosphazenes comprising at least one fluorine atom, the salt comprising a cation including at least one nitrogen atom, shown in the part related to supercapacitors, can be repeated herein for the description of the new compositions.

The invention will now be described in reference to the examples provided below given by way of illustrating and in no way limiting purposes.

DETAILED DISCLOSURE OF PARTICULAR EMBODIMENTS

Example 1

This example illustrates the preparation of different electrolytes: an electrolyte not according to the invention (Paragraph a) below) and four electrolytes according to the invention (Paragraphs b) to e) below).

a) Electrolyte Not According to the Invention (Called Electrolyte $E_0$)

The electrolyte $E_0$ is prepared under a glove box by dissolving 1 mol/L tetraethylammonium tetrafluoroborate salt in an acetonitrile solvent (10 mL).

b) Electrolyte According to the Invention (Called Electrolyte $E_1$)

The electrolyte $E_1$ is prepared from the electrolyte $E_0$, to which hexafluorocyclotriphosphazene (0.1511 g) is added, whereby the hexafluorocyclotriphosphazene content is 1 mass % relative to the total mass of the electrolyte.

c) Electrolyte According to the Invention (Called Electrolyte $E_2$)

The electrolyte $E_2$ is prepared from the electrolyte $E_0$, to which hexafluorocyclotriphosphazene (0.3053 g) is added, whereby the hexafluorocyclotriphosphazene content is 2 mass % relative to the total mass of the electrolyte.

d) Electrolyte According to the Invention (Called Electrolyte $E_3$)

The electrolyte $E_3$ is prepared from the electrolyte $E_0$, to which hexafluorocyclotriphosphazene (0.7873 g) is added, whereby the hexafluorocyclotriphosphazene content is 5 mass % relative to the total mass of the electrolyte.

e) Electrolyte According to the Invention (Called Electrolyte $E_4$)

The electrolyte $E_4$ is prepared from the electrolyte $E_0$, to which hexafluorocyclotriphosphazene (1.662 g) is added, whereby the hexafluorocyclotriphosphazene content is 10 mass % relative to the total mass of the electrolyte.

Example 2

This example illustrates the preparation of a supercapacitor.

The assembly is made in a glove box by successively superimposing a stainless steel lower lid provided with a polypropylene seal, a stainless steel shim, a JCK commercial activated carbon electrode disk (the current collector, which is an aluminium sheet being in contact with the stainless steel shim and the activated carbon-coated face in the upper part), a Freudenberg commercial polyolefin fibres separator soaked with 150 μL of electrolyte (that is, the electrolyte $E_0$, $E_1$, $E_2$, $E_3$ and $E_4$), an activated carbon electrode disk (the activated carbon-coated face being in contact with the separator and the current collector, which is an aluminium sheet in the upper part), a stainless steel shim, a spring and a stainless steel upper lid.

The assembly is then crimped in the glove box.

Example 3

In this example, cyclic voltamperometry tests are carried out with supercapacitors prepared in accordance with example 2 with electrolyte $E_0$ (not according to the invention) and electrolyte $E_1$ respectively.

These tests consist in applying a voltage scanning at a 100 mV/s rate between 0V and 2.7V, repeated thirty times at a temperature of 20° C. to the supercapacitors. The current measurement during these scans enables the specific capacity of an electrode in F/g to be calculated at the end of the test.

The results of specific capacities in F/g are reported in the table below.

|  | Electrolyte $E_0$ | Electrolyte $E_1$ |
| --- | --- | --- |
| Cycle 1 | 112.3 | 123.4 |
| Cycle 10 | 110.3 | 124.2 |
| Cycle 20 | 110.4 | 124.3 |
| Cycle 30 | 110.5 | 124.1 |

It clearly appears that the electrolyte $E_1$ according to the invention enables the supercapacitor, through this cyclic voltamperometry test, to have a capacity improved by 12% (at the thirtieth cycle) with respect to the results obtained with electrolyte $E_0$ containing no additive.

Example 4

In this example, galvanostatic cycling tests are carried out with supercapacitors prepared in accordance with example 2 with electrolyte $E_0$ (not according to the invention) and electrolyte $E_1$ respectively.

These tests consist in imposing a current density of 1 A/g to supercapacitors, alternately charging them up to 2.7V and then discharging them down to 0V (a charge followed by a discharge corresponding to one cycle), for a number of 10 000 cycles at a temperature of 20° C. The discharge time measurement of each cycle enables the capacity of the supercapacitor in F/g to be calculated at the end of the test.

The results of the capacities in F/g are reported in the table below:

|  | Electrolyte $E_0$ | Electrolyte $E_1$ |
| --- | --- | --- |
| Cycle 1 | 32.8 | 33.3 |
| Cycle 500 | 31.3 | 31.8 |
| Cycle 1000 | 30.9 | 31.3 |
| Cycle 2000 | 30.3 | 30.7 |
| Cycle 3000 | 29.8 | 30.2 |
| Cycle 4000 | 29.2 | 29.6 |
| Cycle 5000 | 28.7 | 29.1 |
| Cycle 6000 | 28 | 28.5 |
| Cycle 7000 | 27.3 | 28.0 |
| Cycle 8000 | 26.7 | 27.5 |
| Cycle 9000 | 26.2 | 27.0 |
| Cycle 10000 | 25.8 | 26.6 |

It clearly appears that the electrolyte $E_1$ according to the invention enables the supercapacitor, through this galvanostatic cycling test, to have a capacity improved by 3% (at the 10 000$^{th}$ cycle) with respect to the results obtained with the electrolyte $E_0$. Moreover, during cycling, the decrease in capacities of the supercapacitor containing electrolyte $E_1$ is lower, thus a sign of a better lifetime in use.

Example 5

In this example, flammability tests are carried out for the electrolytes, the preparation of which is set forth in example 1.

To do this, 1 mL of electrolyte is deposited into an aluminium cup. The electrolyte is spread by stirring so as to fully cover the bottom of the cup. Immediately after this operation, a flame is brought in contact with the electrolyte and a timer makes it possible to determine how long it takes for the electrolyte self-extinction, the start of time measurement being set as soon as a flame is visible and the timer is stopped as soon as the flame is extinguished.

The results of self-extinction times (in seconds) for the electrolytes are reported in the table below.

| Electrolyte | Self-extinction time in seconds |
| --- | --- |
| $E_0$ | 29 |
| $E_1$ | 2 |
| $E_2$ | 0 |
| $E_3$ | 0 |
| $E_4$ | 0 |

It clearly appears that adding the additive of the invention in an $E_0$ type electrolyte has a security effect. From the use of 1% of additive (Electrolyte $E_1$) the combustion amount of time is reduced by 93% in comparison with an electrolyte containing no additive ($E_0$). Moreover, as soon as a concentration higher than or equal to 2% of additive is formulated in an $E_0$ type electrolyte, no electrolyte ignition is observed in contact with a flame.

What is claimed is:

1. A supercapacitor comprising at least one cell comprising two electrodes of opposite polarity (respectively a positive electrode and a negative electrode) based on activated carbon between which an electrolyte composition exclusively consisting of at least one nitrile solvent, at least one salt and at least one additive from the family of phosphazenes comprising at least one fluorine atom having the following formula (IV)

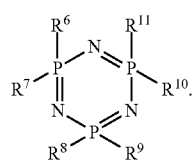

(IV)

in which R⁶ to R¹¹ represent, independently of each other, a halogen atom, a hydrogen atom, an alkyl group comprising from 1 to 12 carbon atoms or an isocyanate group —NCO.

2. The supercapacitor according to claim 1, wherein the at least one nitrile solvent has the following formula (I):

$$R^1-CN \quad (I)$$

in which R¹ represents an alkyl group comprising from 1 to 5 carbon atoms and one or more hydrogen atoms of which can be substituted with fluorine.

3. The supercapacitor according to claim 1, wherein the nitrile solvent is acetonitrile.

4. The supercapacitor according to claim 1, wherein the salt is a lithium salt, a sodium salt, a potassium salt or a salt comprising a cation including at least one nitrogen atom, the positive charge of which is carried by said nitrogen atom.

5. The supercapacitor according to claim 1, wherein the salt is a salt comprising a cation including at least one nitrogen atom, the positive charge of which is carried by said nitrogen atom.

6. The supercapacitor according to claim 5, wherein the cation has the following formula (II):

(II)

in which R², R³, R⁴ and R⁵, identical or different from each other, represent an alkyl group comprising from 1 to 12 carbon atoms.

7. The supercapacitor according to claim 5, wherein the cation is a tetraethylammonium cation.

8. The supercapacitor according to claim 5, wherein the salt comprises an anion, which is a compound comprising a heteroatom carrying a negative charge, which heteroatom is chosen from a nitrogen atom or a boron atom.

9. The supercapacitor according to claim 8, wherein the anion is a perfluorinated borate compound.

10. The supercapacitor according to claim 8, wherein the anion is the tetrafluoroborate compound of the following formula (III):

(III)

11. The supercapacitor according to claim 1, wherein the salt is tetraethylammonium tetrafluoroborate.

12. The supercapacitor according to claim 1, wherein the salt(s) is (are) present at a concentration ranging from 0.1 mol/L to 2 mol/L.

13. The supercapacitor according to claim 1, wherein the additive is a compound having the following formula (V):

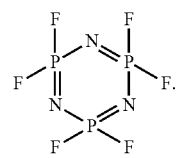

(V)

14. The supercapacitor according to claim 1, wherein the additive(s) is (are) present in an amount from 0.01 to 10 mass %, relative to the total mass of the composition.

15. The supercapacitor according to claim 1, wherein the electrolyte composition is:
   a composition comprising acetonitrile, a tetraethylammonium tetrafluoroborate salt and a hexafluorocyclotriphosphazene additive with a content of 1 mass % relative to the total mass of the composition;
   a composition comprising acetonitrile, a tetraethylammonium tetrafluoroborate salt and a hexafluorocyclotriphosphazene additive with a content of 2 mass % relative to the total mass of the composition;
   a composition comprising acetonitrile, a tetraethylammonium tetrafluoroborate salt and a hexafluorocyclotriphosphazene additive with a content of 5 mass % relative to the total mass of the composition; or
   a composition comprising acetonitrile, a tetraethylammonium tetrafluoroborate salt and a hexafluorocyclotriphosphazene additive with a content of 10 mass % relative to the total mass of the composition.

16. An electrolyte composition exclusively consisting of at least one nitrile solvent, at least one salt and at least one additive from the family of phosphazenes comprising at least one fluorine atom having the following formula (IV)

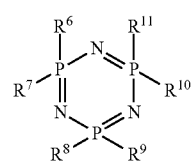

(IV)

in which R⁶ to R¹¹ represent, independently of each other, a halogen atom, a hydrogen atom, an alkyl group comprising from 1 to 12 carbon atoms or an isocyanate group —NCO and wherein the salt is a salt comprising a cation including at least one nitrogen atom, the positive charge of which is carried by said nitrogen atom.

* * * * *